H. GEISENHÖNER.
METAL HEATING DEVICE.
APPLICATION FILED APR. 26, 1918.
1,323,751.
Patented Dec. 2, 1919.
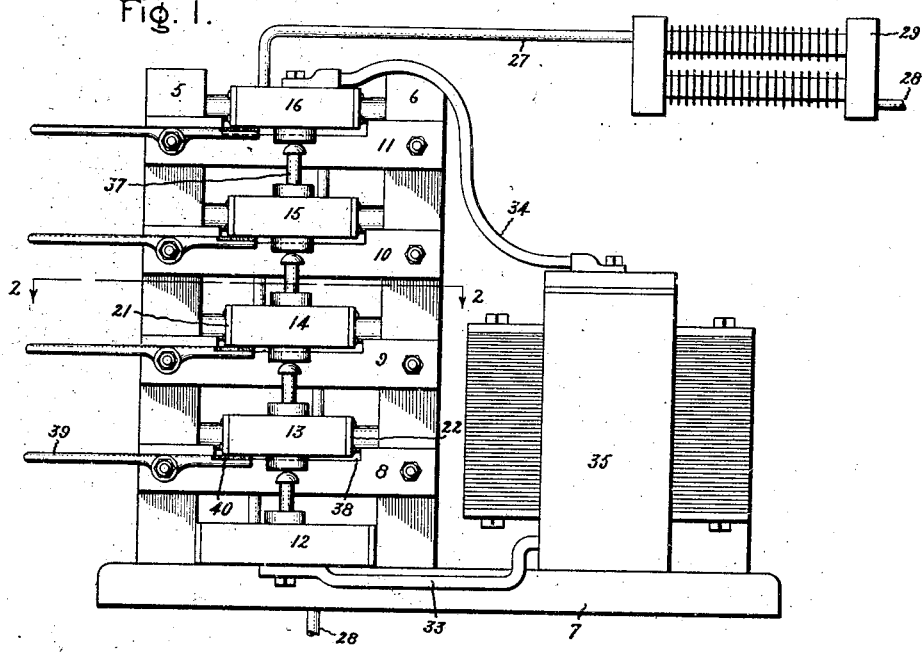
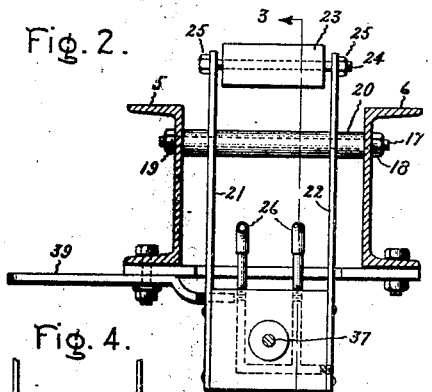
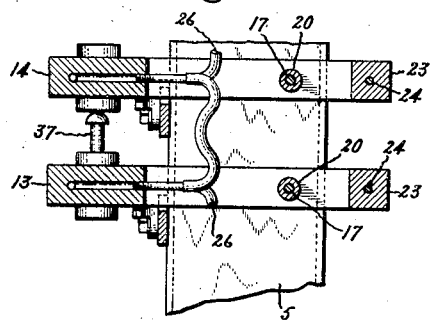
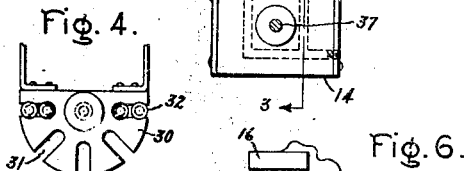
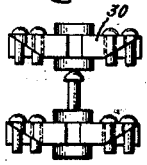
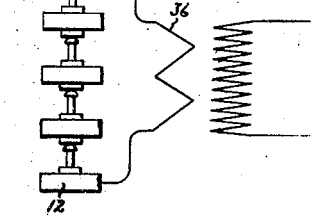
Inventor:
Henry Geisenhöner,
by
His Attorney.

UNITED STATES PATENT OFFICE.

HENRY GEISENHÖNER, OF SCHENECTADY, NEW YORK, ASSIGNOR TO GENERAL ELECTRIC COMPANY, A CORPORATION OF NEW YORK.

METAL-HEATING DEVICE.

1,323,751.  Specification of Letters Patent.  Patented Dec. 2, 1919.

Application filed April 26, 1918. Serial No. 230,949.

*To all whom it may concern:*

Be it known that I, HENRY GEISENHÖNER, a citizen of the United States, residing at Schenectady, in the county of Schenectady, State of New York, have invented certain new and useful Improvements in Metal-Heating Devices, of which the following is a specification.

The present invention relates to the heating of elongated metal objects, such, for example, as bolts, rivets or any other metal parts to be heated and comprises both a novel method of heating and a novel apparatus for carrying out this method.

When bolts, rivets, bars or similar elongated metal objects are heated by the passage of current through the object, the electrodes being applied at each end, the objects are apt to be overheated at the contact points. Local heating begins at some spot of poor contact and as this spot becomes heated, its resistance rises, hence causing conditions to rapidly become worse until local melting occurs.

In accordance with my invention, this difficulty has been overcome by passing current through a plurality of objects in series. Between successive periods of current application, an object which has attained a desired temperature may be replaced by an unheated object, each object usually being in a different phase of heat treatment, or at a different temperature. My invention also includes a heating apparatus hereinafter more fully described for carrying out this process.

The accompanying drawing illustrates one form of apparatus embodying my invention, Figure 1 being a side elevation; Fig. 2 is a horizontal section taken on lines 2—2; Fig. 3 is a longitudinal section of part of the welding apparatus taken on lines 3—3 of Fig. 2; Figs. 4 and 5 illustrate a heat radiator for the electrode; Fig. 6 is a diagram of electrical connections.

Referring to Fig. 1, the apparatus illustrated comprises a frame constituted by uprights 5, 6 consisting conveniently of channel iron, provided with an insulating base 7, and provided with a plurality of transverse supports 8, 9, 10 and 11, bolted to the channel irons. These supports may consist of asbestos board, or other suitable insulating material. Resting on the insulating base 7 is an electrode 12 and spaced above the same substantially equal distances are electrodes 13, 14, 15 and 16, each of the electrodes 13—16 being pivotally supported on the channel iron frame. As shown in Fig. 2, these electrodes 13—16 are carried by rods 17 held in place at each end by nuts 18 and 19, and surrounded by an insulating sleeve 20 consisting, for example, of fiber tube, to prevent the electrodes being short circuited by the channel irons. As shown best in Figs. 2 and 3, each of the electrodes 13—16 is fastened to one end of a frame consisting of bars 21, 22, through which the insulated rod 17 passes. At the end of the frame opposite the electrodes is fastened a counterweight 23 attached to the bars 21, 22, by a rod 24, provided at each end with a nut 25. Each of the electrodes 12 to 16 is preferably made hollow, as shown in Fig. 3 and cooled by circulation of water, or other suitable fluid, supplied by tubes 26. These tubes may be supplied with cooling liquid in any suitable way but conveniently they may be connected by conduits 27, 28, to a radiator 29, as shown in Fig. 1.

In some cases the electrodes 12 to 16 can be sufficiently cooled by a circulation of air and for that purpose are provided with heat-dissipating flanges, or fins 30, as shown in Figs. 4 and 5. These air cooled radiators may conveniently be provided with slots 31 into which may be hung rivets 32, which are in this manner pre-heated to some extent and may be removed by the workmen and inserted in the rivet heating machine, cold objects being substituted in their place. In that manner heat which would otherwise be wasted is usefully employed to bring the objects to be heated part way up to the desired temperature.

Heating current is supplied by suitable heavy copper conductors 33, 34, connected to a suitable source of energy, such as a transformer 35. The connection of the electrodes 12—16 to secondary winding 36 is shown in Fig. 6.

In the apparatus above described a heating load consisting, for example, of rivets 37, is inserted between the successive electrodes, the electrodes being slightly lifted away from the recess 38 in each of the lateral supports, this being conveniently done by the handles 39 pivotally attached to the upright 5 and provided with an insulating pad 40 at the region of contact with the corresponding electrode. The object of the recess 38 in each of the lateral supports is to enable the weight of the electrodes to be exerted upon the objects being heated without resting on the supports 8—11, so as to insure a firm butt contact when a suitable heating current is supplied by the transformer. The series connected rivets are gradually brought up to the desired temperature uniformly throughout their length. Apparently the ballasting effect of each of the objects in the series upon each other prevents local overheating as the drop of potential must remain distributed and cannot pile up at one particular region of poor contact which would become overheated were a single object placed between the terminals of a transformer. There is also a reactive ballasting effect, caused largely by the current path being surrounded by metal, each of the electrodes 8 to 11 being materially larger than the objects being heated.

When one of the rivets in the series is sufficiently heated it is replaced by a cold rivet, the heat in the rest being distributed during the intervening interval. The current is again applied, and when another rivet has been fully heated it in turn is replaced by a cold rivet. Each increment of current causes one of the rivets in the series to attain its desired high temperature while the rivet most recently inserted is given its first heating, which in the ordinary operation of the device does not usually bring it up to visible redness.

When the rivets which have become fully heated are removed they should be withdrawn without releasing the weight of the electrodes thereby tending to clean the electrodes at the point of contact. In some cases when some scale or other insulating material has accumulated on the electrodes or the ends of the objects to be heated are not bright, it may be necessary to tap the upper electrode in order to make a better contact, but if ordinary care is exercised during the operation of the device and a suitable voltage impressed upon the series, no difficulty will be experienced.

The described device may be used for various heat treating and tempering operations.

What I claim as new and desire to secure by Letters Patent of the United States, is:—

1. The method of heating objects such as bolts and rivets having an imperfect contact surface, which consists in applying butt contacts to a plurality of said objects, applying pressure to said contacts and passing electric current through said objects in series.

2. The method of heating elongated objects, such as bolts and rivets, which consists in conducting electric current longitudinally through a plurality of said objects connected electrically in series with each other, dissipating heat generated at the contacting ends of said objects, and successively replacing objects having attained a desired temperature by unheated objects.

3. The method of heating elongated objects, such as bolts and rivets, which consists in periodically passing an electric heating current through a plurality of said objects in series and successively replacing between periods of current input objects in said series which have attained a desired temperature with unheated objects thereby causing each object to be subjected to more than one period of current input.

4. A metal heating device comprising a pair of electrodes, one or more bodies having good electrical and heat conductivity located intermediate said electrodes and adapted to complete an electrical circuit between a plurality of objects to be heated held respectively between the same and said electrodes.

5. A metal heating device comprising a frame, a series of electrodes adapted to receive objects to be heated, supported at spaced intervals on said frame, means for conducting a heating current to the outermost electrodes at opposite ends of said series and insulating means for supporting said electrodes when not supported by the objects to be heated.

6. A device for heating rivets and the like having imperfect contact surfaces, comprising a plurality of electrodes between which the articles to be heated are adapted to be interposed, and means for supplying a current in series through said electrodes and interposed articles.

7. An apparatus for heating rivets and the like comprising a stationary electrode, a plurality of movable electrodes constructed and arranged so that the articles to be electrically heated may be interposed between said electrodes and a transformer winding connected to supply current in series through a plurality of said electrodes and the articles interposed therebetween.

In witness whereof I have hereunto set my hand this 24th day of April, 1918.

HENRY GEISENHÖNER.